US006804249B1

(12) United States Patent
Bass et al.

(10) Patent No.: US 6,804,249 B1
(45) Date of Patent: Oct. 12, 2004

(54) METHOD AND SYSTEM FOR NETWORK PROCESSOR SCHEDULING BASED ON CALCULATION

(75) Inventors: Brian Mitchell Bass, Apex, NC (US); Jean Louis Calvignac, Cary, NC (US); Marco C. Heddes, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,911

(22) Filed: Apr. 13, 2000

(51) Int. Cl.[7] .............................................. H04L 12/56
(52) U.S. Cl. .................................... 370/412; 370/395.4
(58) Field of Search ................................ 370/229, 231, 370/232, 233, 235, 412, 429, 395.4, 395.41, 395.42, 395.43; 708/495, 497, 498; 709/234, 240, 241, 242; 714/48, 51, 52, 53, 54

(56) References Cited

U.S. PATENT DOCUMENTS

| | | | | |
|---|---|---|---|---|
| 5,260,935 A | 11/1993 | Turner | | 370/60 |
| 5,339,311 A | 8/1994 | Turner | | 370/60 |
| 5,367,523 A | 11/1994 | Chang et al. | | 370/84 |
| 5,689,508 A | 11/1997 | Lyles | | 370/391 |
| 5,781,531 A | 7/1998 | Charny | | 370/232 |
| 5,793,747 A | 8/1998 | Kline | | 370/230 |
| 5,850,399 A | 12/1998 | Ganmukhi et al. | | 370/412 |
| 5,917,822 A | 6/1999 | Lyles et al. | | 370/395 |
| 5,923,644 A | 7/1999 | McKeon et al. | | 370/230 |
| 5,923,656 A | 7/1999 | Duan et al. | | 370/395 |
| 5,926,459 A | 7/1999 | Lyles et al. | | 370/230 |
| 5,940,375 A | 8/1999 | Soumiya et al. | | 370/249 |
| 5,959,993 A | 9/1999 | Varma et al. | | 370/397 |
| 5,995,511 A | 11/1999 | Zhou et al. | | 370/412 |
| 5,996,019 A | 11/1999 | Hauser et al. | | 709/235 |
| 6,108,305 A | * | 8/2000 | Charny et al. | 370/232 |
| 6,130,878 A | * | 10/2000 | Charny | 370/230 |
| 6,452,933 B1 | * | 9/2002 | Duffield et al. | 370/415 |
| 6,661,774 B1 | * | 12/2003 | Lauffenburger et al. | 370/230.1 |

* cited by examiner

*Primary Examiner*—Huy D. Vu
*Assistant Examiner*—Toan Nguyen
(74) *Attorney, Agent, or Firm*—Joscelyn G. Cockburn; Kenneth A. Seaman

(57) ABSTRACT

A system and method of moving information units from a network processor toward a data transmission network in a prioritized sequence which accommodates several different levels of service. The present invention includes a method and system for scheduling the egress of processed information units (or frames) from a network processing unit according to service based on minimum bandwidth specifications where position in the queue is adjusted after each service based on minimum bandwidth specificaiton and the length of frame, a process which is subject to rounding errors. To avoid the accumulation of rounding errors inequitably influencing the position of some in the queue, a system to adjust for the rounding errors adds an increased measure of fairness to the system.

9 Claims, 7 Drawing Sheets

METHOD AND SYSTEM FOR NETWORK PROCESSOR SCHEDULING BASED ON CALCULATION

CROSS REFERENCE TO RELATED PATENTS

The present invention is related to the following documents, all of which are assigned to the assignee of the present invention and which are specifically incorporated herein by reference:

Patent application Ser. No. 09/384,691, filed Aug. 27, 1999 by Brian Bass et al., entitled "Network Processor Processing Complex and Methods", sometimes referred to herein as the Network Processing Unit Patent or NPU Patent.

U.S. Pat. No. 5,724,348 entitled "Efficient Hardware/Software Interface for a Data Switch" issued Mar. 3, 1998, which patent is sometimes referred to herein as the Interface Patent.

Patent application Ser. No. 09/330,968 filed Jun. 11, 1999 now U.S. Pat. No. 6,222,380 and entitled "High Speed Parallel/Serial Link for Data Communications", sometimes referred to as the Link Patent.

Various patents and applications assigned to IBM for its multiprotocol switching services, sometimes referred to as "MSS", some of which include Cedric Alexander as an inventor, and are sometimes referred to as the MSS Patents.

Patent application Ser. No. 09/548,907 filed concurrently by Brian M. Bass et al. and entitled "Method and System for Network Processor Scheduler". This patent is sometimes referred to herein as the Scheduler Structure Patent.

Patent application Ser. No. 09/548,910 filed concurrently by Brian M. Bass et al. and entitled "Method and System for Network Processor Scheduling Outputs Based on Multiple Calendars". This patent is sometimes referred to herein as the Calendar Scheduling Patent.

Patent application Ser. No. 09/834,141 filed concurrently by Brian M. Bass et al. and entitled "Method and System for Network Processor Scheduling Based on Service Levels". This patent is sometimes referred to herein as the Service Level Patent.

Patent application Ser. No. 09/548,912 filed concurrently by Brian M. Bass et al. and entitled "Method and System for Network Processor Scheduling Outputs Using Queueing". This patent is sometimes referred to herein as the Queueing Patent.

Patent application Ser. No. 09/548,913 filed concurrently by Brian M. Bass et al. and entitled "Method and System for Network Processor Scheduling Outputs using Disconnect/Reconnect Flow Queues. This patent is sometimes referred to herein as the Reconnection Patent.

Patent application Ser. No. 09/546,651 filed April 2000 by Brian M. Bass et al. and entitled "Method and System for Minimizing Congestion in a Network". This patent is sometimes referred to herein as the Flow Control Patent.

Patent application Ser. No. 09/547,280 filed Apr. 11, 2000 and entitled "Unified Method and System for Scheduling and Discarding Packets in Computer Networks". This patent is sometimes referred to herein as the Packet Discard Patent.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for scheduling the distribution of information units from a flow control system coupled to a plurality of network processing unit toward a data transmission network through a MAC. More particularly, the present invention involves scheduling using a plurality of algorithms to handle a plurality of users who are processing variable size information packets or frames, providing an order to the frames being provided from the flow control system (which may be of the type described in the referenced Flow Control Patent) toward the data transmission network while allowing for a plurality of different priorities to be accorded to the different users.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost. Technologies such as voice over IP (VoIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or frame header methods). Those using a resource will consider the quality of service as well as the cost of service, with the tradeoffs depending on the situation presented. It is desirable to allow a variety of different priorities or scheduling algorithms to a user, with the user deciding whether he wants (and will pay the charges associated with) a guaranteed bandwidth, best effort, or a guaranteed bandwidth with best effort for peak. In addition, it is desirable that a system for allocating bandwidth have a system for enforcing the priorities and bandwidth which has been selected by a user by denying the user capacity in excess of that which the user has selected and paid for.

Some prior art systems handle outgoing information units from a processing system in a variety of ways. One suggestion is to use a round robin scheduler which fairness amongst a set of queues. Another one employs several different levels of priorities and a queue for each. In such a system, you have an absolute priority where the highest priority work is processed first and the lowest priority work may never get serviced. Still another method of scheduling outputs involves a plurality of prioritized lists. It is also known to use a hierarchical packet scheduling system. There are even systems which use several different scheduling methods in determining the order in which information units are to be sent toward a data transmission network, using a combination of different scheduling techniques.

Other systems have used a weighted priority technique implemented in the form of a round robin—which serves all queues, with some queues served more frequently than other queues, based on an algorithm which defines the level of service. Even such a weighted priority system would provide service to a user who continually exceeds the service levels assigned to it, continuing to serve, albeit less often, even as it exceeds the assigned service level and making it difficult for the system to enforce a level of service policy.

Considering the size of a packet or frame in determining which customers to serve adds a measure of fairness to a service system, in that a user who is processing large frames takes up more of the system capacity and therefore should receive service less often than a user with small frames. Some of the prior art systems consider the size of the transmission in allocating resources, while others do not. Some communication systems use a uniform, fixed-size packet, making consideration of packet size unnecessary, but others do not consider the size of the packet in allocating resources.

Other prior art system are directed to handling information units which are of a common size as in the so-called Asynchronous Transfer Mode (or ATM) system, so that size of the information unit is not considered in determining the priority of the current or a future information unit. An ATM system with a weight-driven scheduler is one of the solutions which is known in the prior art to schedule outputs from an ATM system.

In any such system which involves weighting and queueing, certain inequities may occur through rounding or other rules. While the effect of such inequities may be minor in each instance, the accumulated effect may be substantial and inequitable.

Thus, the prior art systems for handling data packets for transmission to a network have undesirable disadvantages and limitations which have an effect on the perceived fairness of the system.

SUMMARY OF THE INVENTION

The present invention overcomes the disadvantages and limitations of the prior art systems by providing a simple, yet effective, way of handling information units or frames coming out of a processing system and directing frames to output ports for dispatch to a data transmission network while providing a weighted fair queueing system for users of that service.

The present invention allows for a simple algorithm to be used for calculating the next position in the queue without complex division or other unusual hardware requirements. The present invention also provides for an identification of errors in the system of calculating position and makes an adjustment for those errors periodically.

The present invention has the advantage that it allows the efficient use of resource and requires a minimum overhead to increase the fairness of the algorithm.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be is described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
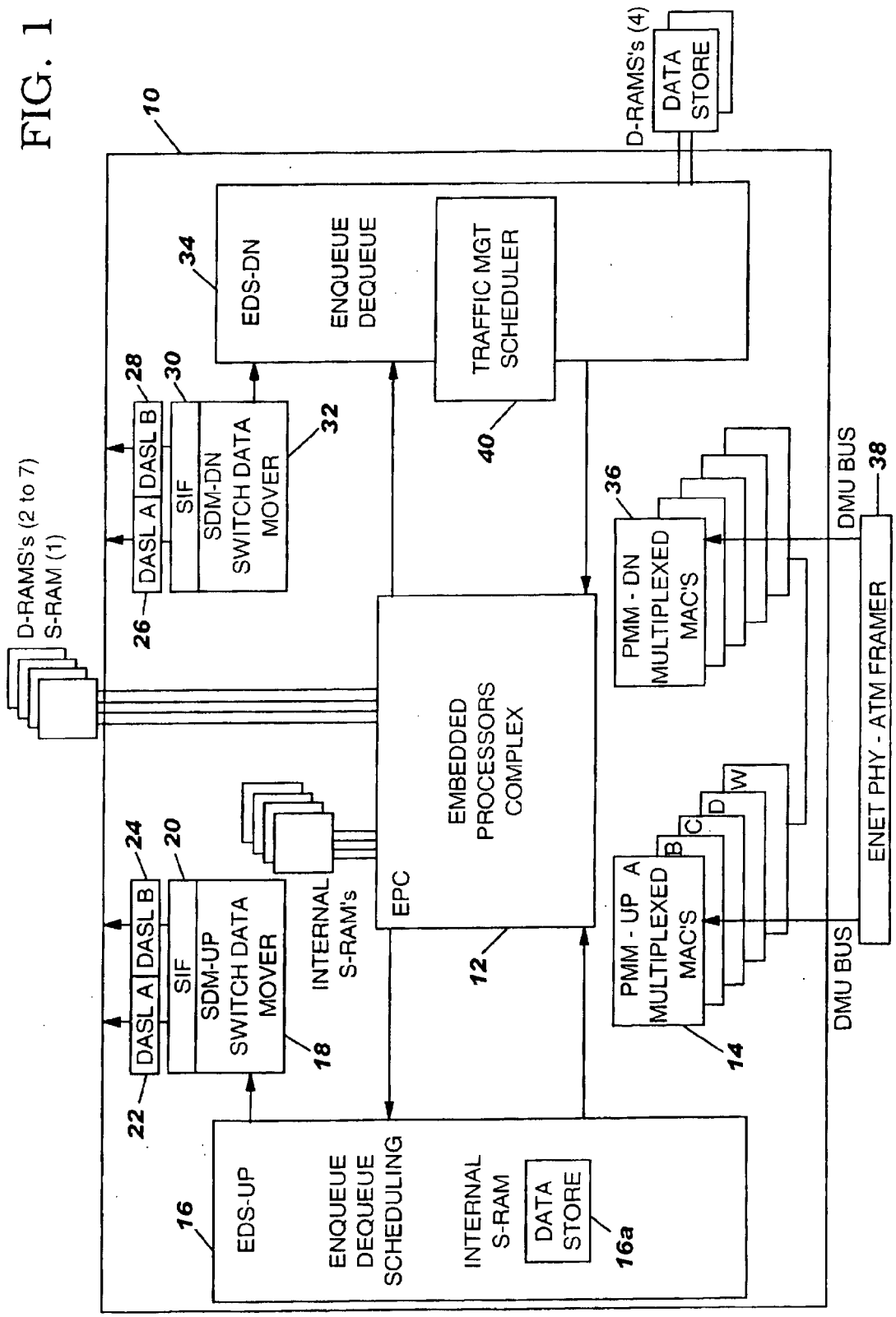
FIG. 1 is a block diagram for an interface device including embedded processor complex which is described in the NPU Patent, showing a DN Enqueue system and scheduler useful in practicing the present invention.

FIG. 1 shows a block diagram of the interface device chip that includes the substrate 10 and a plurality of subassemblies integrated on the substrate. The subssemblies are arranged into an upside configuration and a downside configuration, with he "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, Switch Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, switch interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors. After the input units or frames are processed by one of the plurality of processors in the embedded processor complex, the completed information units are sent to the switch (through SDM UP 18, SIF 20, and DASL A or B, 22 or 24) to be delivered to an egress side of a network processor. Once the information units are received on the egress side of the network processor, they are processed by one of the plurality of processors in the embedded processor complex 12, and when the egress processing is completed, they are scheduled through the scheduler 40 out of the processing unit 10 and onto the data transmission network through the PMM-DN multiplexed MAC's 36 and the physical layer 38.

Figure 2:
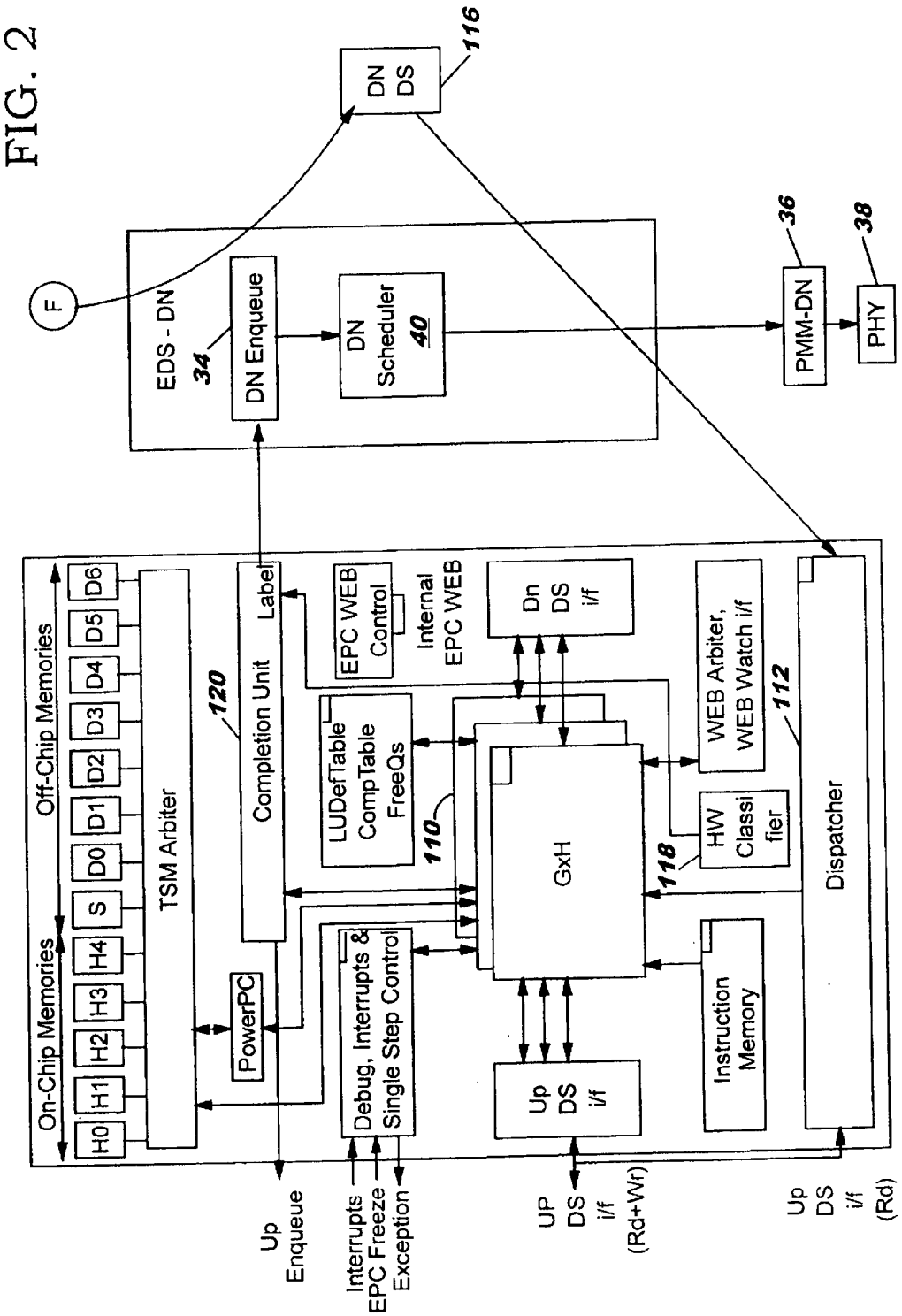
FIG. 2 is a block diagram of an embedded processor complex of type shown in FIG. 1, with the DN Enqueue (and its included scheduler) useful in understanding the resent invention.

FIG. 2 is a block diagram of a processing system 100 which can employ the present invention to advantage. In this FIG. 2, a plurality of processing units 110 are located between a dispatcher unit 112 and a completion unit 120. Each incoming frame F (from a switch, not shown, attached to the present data processing system) is received and stored into a DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent.

Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled through the PMM DN MAC's 36, then by the DMU data bus to the physical layer 38 (the data transmission network itself).

Figure 3:
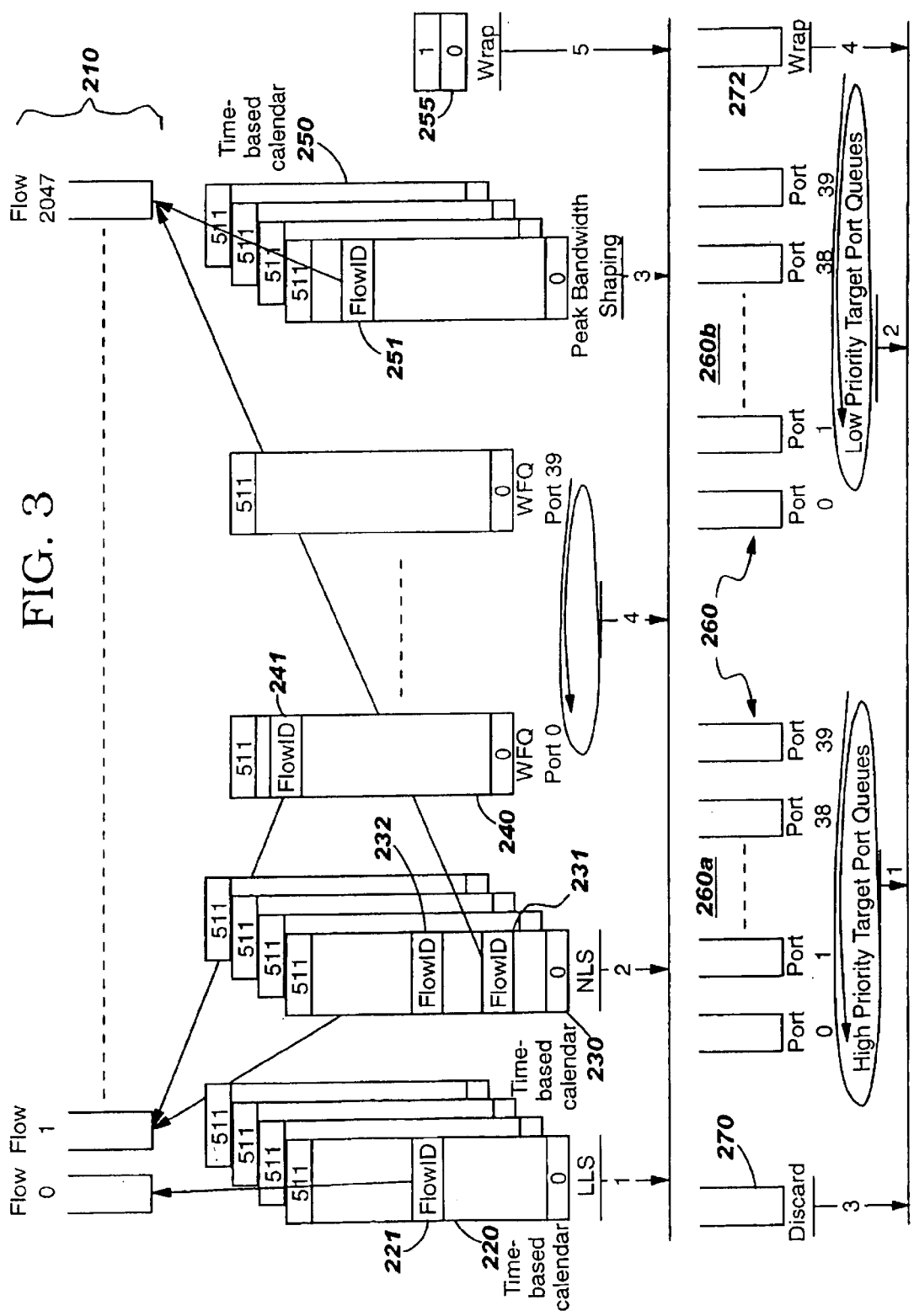
FIG. 3 illustrates the scheduler of FIGS. 1–2, illustrating a system for scheduling egress of variable length packets according to the preferred embodiment of the present invention, in an "egress scheduler".

The egress scheduler 40 of FIG. 3 provides a structure and method of operation which permits the functions of scheduling frame transmission from a network processing unit to a data transmission network in accordance with a minimum bandwidth algorithm, peak bandwidth algorithm, weighted fair queueing techniques and maximum burst size scheduling in a single unified scheduler system. It is described more fully in the Scheduler Structure Patent referenced above.

The scheduler system illustrated in FIG. 3 is comprised of a plurality of flows 210, time-based calendars 220, 230, 250, weighted fair queueing (WFQ) calendars 240 and target port queues 260.

The flows 210 are control structures that are used to maintain ordered lists of frames which share common system characteristics based on assignment, that is, the level of service that the associated user has selected and paid for. These characteristics include minimum bandwidth, peak bandwidth, best effort bandwidth and maximum burst size quality of service (QoS) requirements. In addition to flow queues set up for the purpose of supporting QoS for communication systems, the preferred embodiment requires flow queues defined for the purpose of discarding frames (i.e. filtered traffic), and the wrapping of frame data from the egress to the ingress of the network processor system.

Time-based calendars 220, 230, 250 are used for scheduling packets with minimum bandwidth and best effort peak rate requirements. As shown in FIG. 3, three time based calendars are used for this purpose: two calendars 220, 230 for minimum bandwidth and a third calendar 250 used to limit flow queues to a maximum best effort peak rate (peak bandwidth shaping). Two time-based calendars 220, 230 (one calendar 220 identified as low latency service or LLS and the other calendar 230 identified as normal latency service or NLS) provide for minimum bandwidth and allow support of different classes of service within a minimum bandwidth QoS class (i.e., low latency and normal latency).

Weighted fair queuing (WFQ) calendars 240 are used for best effort service, and best effort peak service (when used in combination with of the time-based calendar 250). Further, the WFQ calendars 240 support a queue weight that allows support of different classes of service within a best effort service QoS class. In the preferred embodiment there are 40 such WFQ calendars, corresponding to the number of supported media ports (output ports). The selection of 40 such ports is a trade off between hardware cost and design complexity and is not intended to limit the scope of the invention.

In each of the above mentioned calendars, a pointer (a Flow ID) is used to represent a flow queue's location within the calendar. Thus, flow 0 has its Flow ID 221 in calendar 220, flow 1 has a FlowID 232 in calendar 230 and FlowID 241 in the WFQ 240 and flow 2047 has a FlowID 231 in calendar 230 and FlowID 251 in calendar 250, all as indicated by the arrows in FIG. 3. Further there may be none, one, or two such pointers to a single flow queue present in the plurality of calendars in the system. Typically, pointers in a calendar do not represent un-initialized or empty flow queues. When a pointer to a flow queue (or a FlowID) is present in a particular calendar in the system, the flow queue may be referred to as being "in" that particular calendar.

Target port queues are control structures used to maintain ordered lists of frames that have common port destination and priorities. In the preferred embodiment, 2 priorities per media port (or output port) are provided to allow support of different classes of service, a so-called high priority target port queue and a so-called low priority target port queue. The selection of 2 priorities is a trade off between hardware cost and design complexity and is not intended to limit the scope of the invention. Further, the preferred embodiment includes a separate wrap queue 272 and a discard port queue 270.

Figure 4:
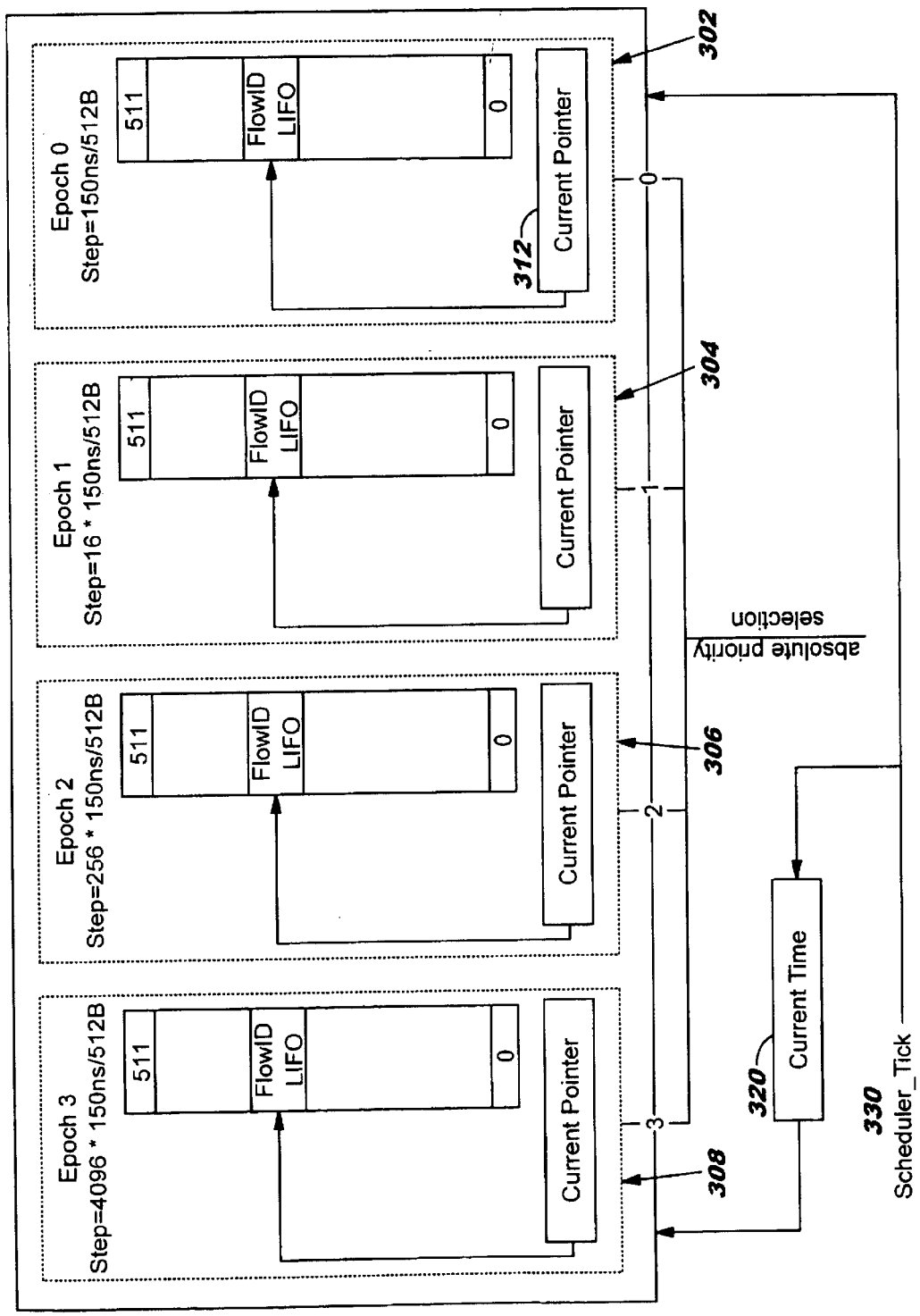
FIG. 4 illustrates a current time register for the egress scheduler of FIG. 3, showing its component epochs.

Each of the time-based calendars 220, 230 and 250 consists of a plurality of epochs, with four shown for each in FIG. 3 as represented by the overlapping rectangles. FIG. 4 shows the four epochs 302, 304, 306 and 308 along with a typical timing arrangement for the epochs where the first epoch 302 (labeled epoch0) has a step of the scheduler tick(512 bytes can be scheduled every 150 ns), the second epoch 304 has a step of 16 times that of the first epoch 302, with the third epoch 306 having the same ratio to the second epoch 304 and the fourth epoch 308 having the same ratio to the third epoch 306. A current pointer (e.g., 312 for epoch 302) is associated with each epoch to provide a pointer as to where in the epoch the processing is currently located. Since the system of progressing through the epochs is to increment the current pointer, the direction of processing is from lower to higher in the epoch and then reaching the top of the epoch wrapping back to the bottom and continuing. Also shown in this FIG. 4 is the current time 320 and a scheduler tick 330 which drives the current time 320 as well as the flow queue selection process within each epoch and a priority selection of selected flow queues amongst the epochs.

The priority selection is an absolute priority selection, which means that since only one can be serviced during any interval, the one with the highest priority is serviced. If the current pointer in each of the epochs points to a flow queue, the lowest one (epoch0) will be serviced. If epoch 0 requires no service, then epoch1 is serviced, then epoch2, etc.

Figure 5:
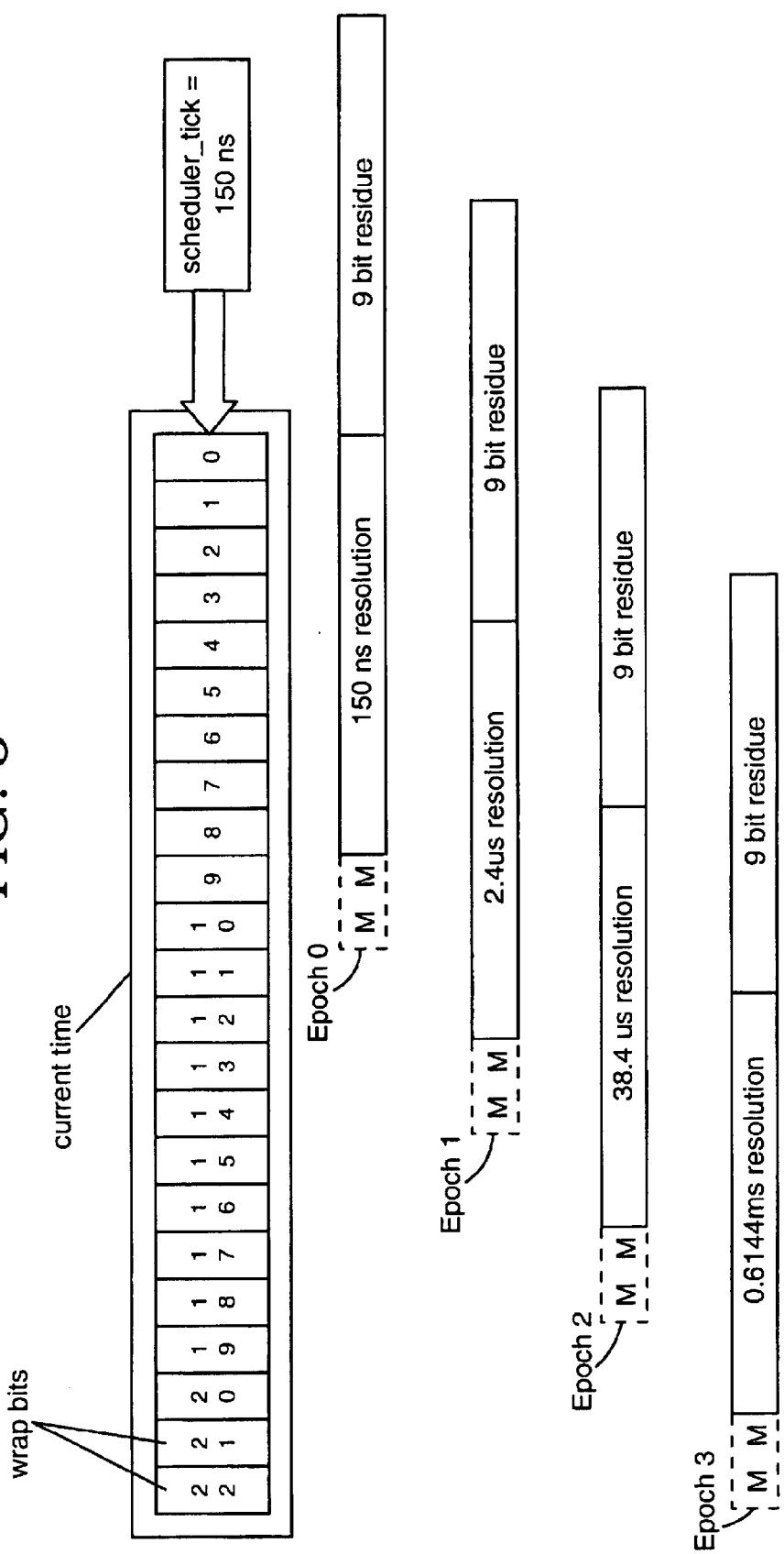
FIG. 5 illustrates a diagram showing how the epochs of FIG. 4 have different time resolutions in the egress scheduler of FIG. 4.

FIG. 5 illustrates the time resolution of bits for each of the epochs of FIG. 4.

Figure 6:
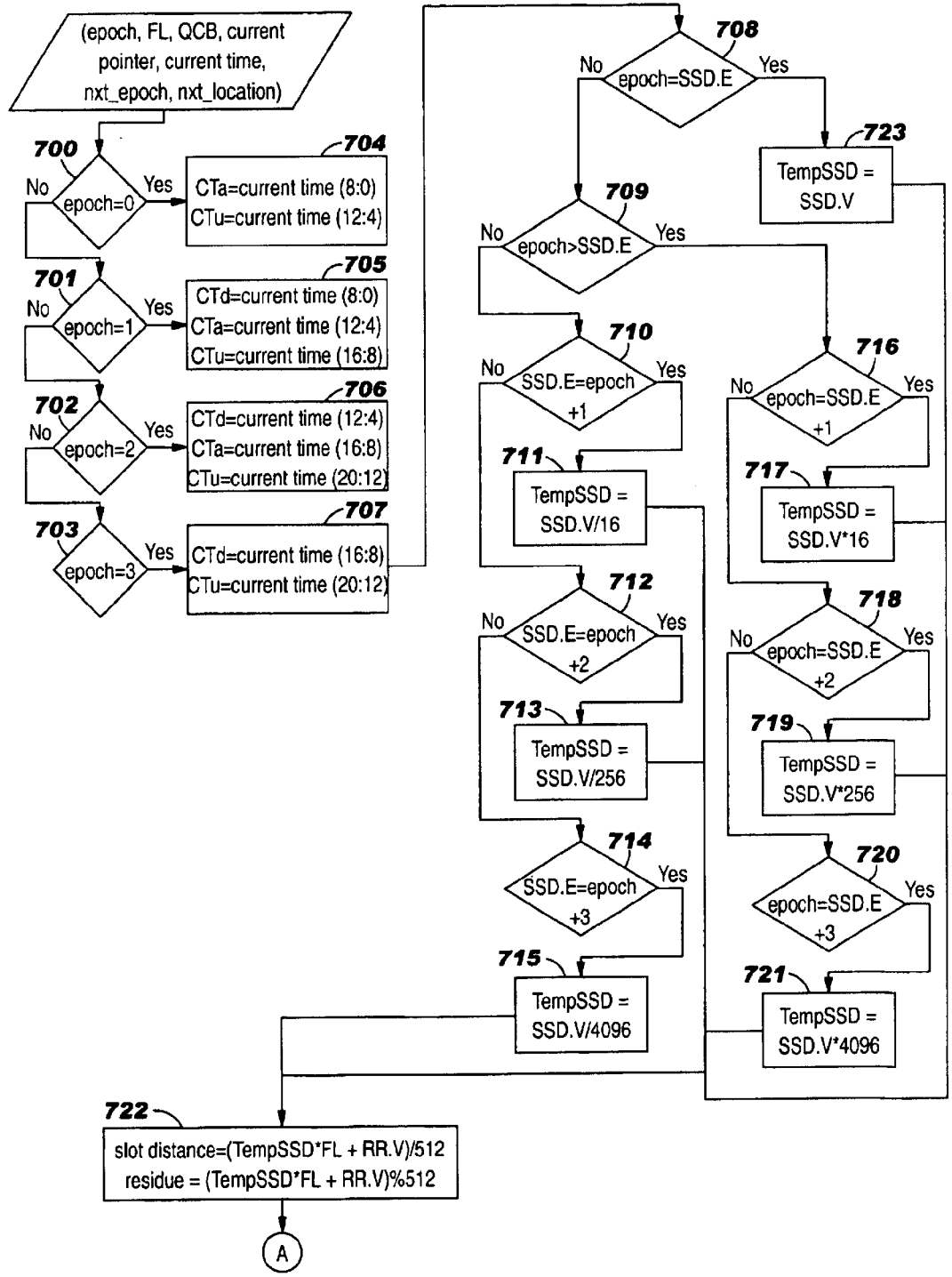
FIGS. 6–7 are logic flow charts illustrate the distance calculation for the time based calendars according to the preferred embodiment.
Figure 7:
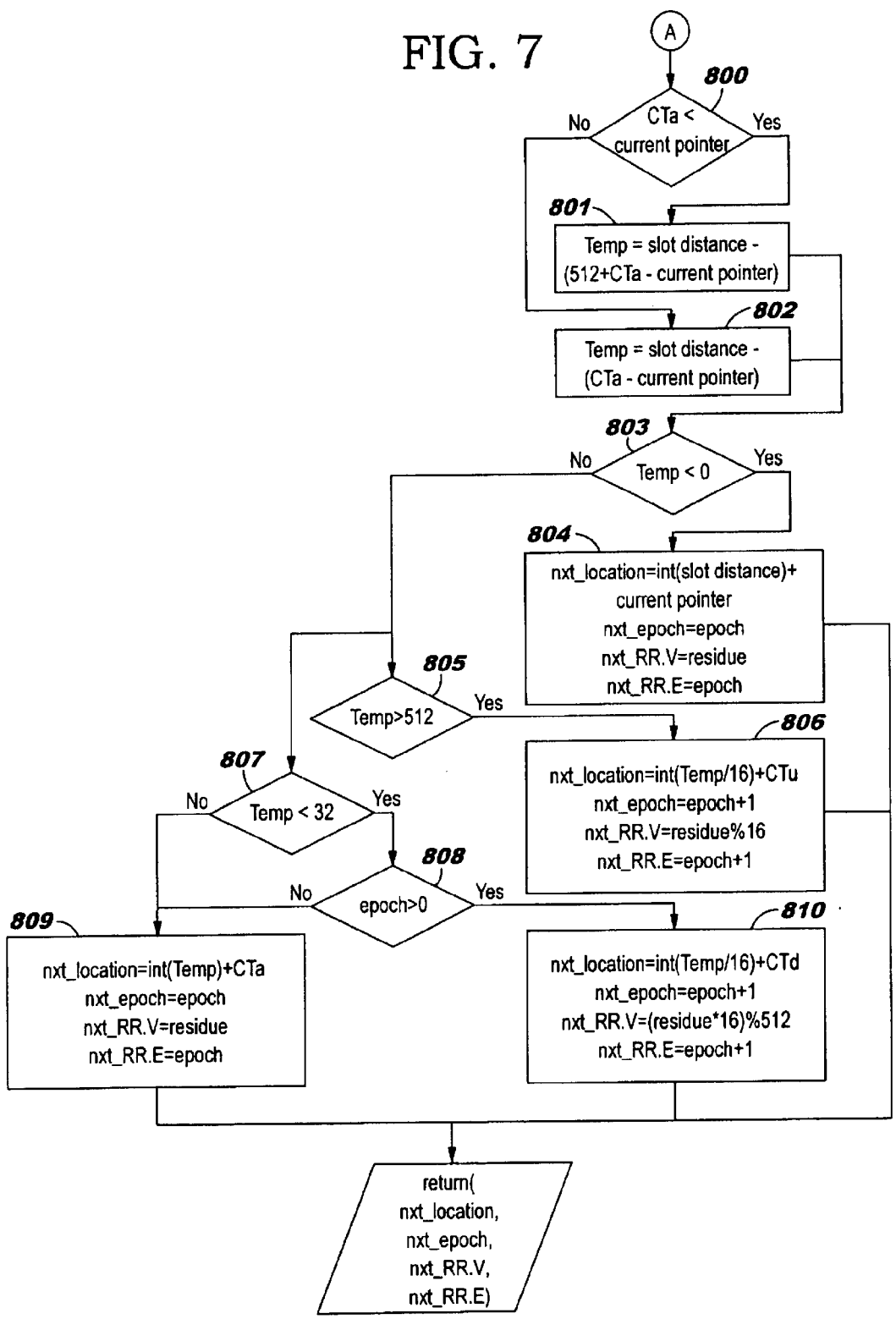

FIGS. 6 and 7 illustrate the distance calculation for the time based calendars according to the preferred embodiment.

Once a flow queue has been selected from a time based calendar and has been serviced, the FrameCount field is examined. In the case of the NLS and LLS calendars 220, 230, if the count is greater than 0, then the pointer to the flow queue must be moved from its present location in the calendar. A distance calculation is performed, resulting in the new location for the pointer to the flow queue within the calendar. Additionally, a residue value is generated that is used to accumulate the error generated during the distance calculation.

According to the preferred embodiment, the residue field is comprised of a 9 bit value field, RR.V and a 2 bit scaling factor RR.E. FIGS. 6 and 7 illustrate the method of calculating the distance, the new location within the calendar, and the residue field. Further, this method accounts for cases where the current pointer lags behind the current time, an event that occurs when several pointers occupy the same slot in an epoch. The input to the method is comprised of the flow queue control block (QCB), the current pointer value, the current epoch value, the current time, and the frame length (FL). The BCI in the frame control block is used to determine the frame length. The method returns the next slot location (nxt_location), the new epoch (nxt_epoch), and the new value for the residue (nxt_RR.V and nxt_RR.E).

Starting with FIG. 6, blocks 700–703 are used to determine the bits of the current time register needed for the distance calculations. Blocks 704 through 707 assign values to:

CTa, the bits corresponding to the current time used for this epoch.

CTu, the bits corresponding to the next epoch (epoch+1)

CTd, the bits corresponding to the previous epoch (epoch−1)

Since the distance calculations are performed relative to the current epoch, the scaling factor of the sustained service rate must be examined. According to the preferred embodiment, a change of scaling factors introduce a change of 16×. A floating point value of SSD.V is created, TempSSD. Block 708 determines if the epoch and the scaling factor, SSD.E, used by the sustained service rate are the same, if true, then no modification is required to the value of SSD.V at block 723 and the process continues at 722. Otherwise, the flow continues at 709 to determine if the epoch is greater than SSD.E, if so, then tests at 716, 718 and 720 determine the change required to SSD.V at blocks 717, 719 and 721, and the process continues at 722. Returning to 709, if the epoch is less than SSD.E, then tests at 710, 712 and 714 determine the change required to SSD.V at blocks 711, 713 and 715, and the process continues at 722.

At block 722, the distance calculation is performed. As described in the Calendar Scheduling Patent, a step is defined as the unit of time where 512 bytes are moved, hence in the absence of any residue, the calculation would have the form:

Slot distance=sustained service rate*(FL/512).

Since the scaling factor for residue is defined to be the same as the epoch the flow queue is found in, and the value is a fraction step, the calculation takes on the form found in 722. The residue is remainder from the division as can be seen using the modulo operator '%'. The process continues at block 800 in FIG. 7.

Since it is possible for the current pointer of an epoch to trail behind the current time, 800, 801 and 802 are used to generate an intermediate result, Temp, which is tested at 803. Since the current pointer has a range of 512 (0 to 511) in the preferred embodiment, CTa will wrap and there will be cases where CTa is numerically smaller than the current pointer. Since the current pointer is constrained from moving past the current time, an adjustment is required to the calculation of Temp.

When Temp is found to be a negative number at 803, slot distance is insufficient to place the flow queue pointer at or beyond the current time. Instead of robbing bandwidth from the flow queue, the calculation at 804 uses the current pointer as the basis for determining the next location in the current epoch for the pointer to the flow queue.

When Temp is found to be a non-negative number, tests are made to determine if the flow queue should move to either a higher or lower epoch. It is desirable to keep the a flow queue in the lowest numbered epoch possible since this is where the greatest accuracy occurs. However, the step distance may not be containable within the current epoch and must be moved to a higher epoch. Block 803 continues at blocks 805 and 807 to handle both of these cases.

At block 805 a test is made to see if the step distance is greater than or equal to 512, if so, the step distance calculated cannot be contained in the current epoch and the process continues at block 806 where Temp is reduced by a factor of 16 and the next location is determined based on the value of CTu, the current time bits for the next higher epoch. The RR.V is the result of the modulo division of the residue, calculated at 722 in FIG. 6, by a factor of 16. The process concludes by returning the next location, next epoch, next RR.V and next RR.E values.

At block 807, a test is made to see if the step distance is small enough to allow the use of the next lower epoch. Temp is tested at 807 to determine if it is less than 32 and if the current epoch is greater than 0 (tested at 808). If so, the process continues at 810 where Temp is increased by a factor of 16 and the next location is determined based on the value of CTd, the current time bits for the next lower epoch. The RR.V is a result of multiplying the residue, calculated at 722 in FIG. 6, by the factor of 16 and using modulo division to keep the value in the correct range. The process concludes by returning the next location, next epoch, next RR.V and next RR.E values.

Returning to 807, if Temp is equal to or greater than 32, or if Temp is less than 32, but the epoch is 0 (as tested at 808) the process continues at 809. For this case, an epoch change does not occur. The next location is based on the current time bits for the current epoch and the next RR.V is the residue calculated at 722 in FIG. 6. The process concludes by returning the next location, next epoch, next RR.V and next RR.E values.

Of course, many modifications of the present invention will be apparent to those skilled in the relevant art in view of the foregoing description of the preferred embodiment, taken together with the accompanying drawings. Additionally, many modifications can be made to the system implementation and the system of priorities and various algorithms can be used for determining priority of service without departing from the spirit of the present invention. Other systems for detecting and compensating for systematic errors can be used to improved the fairness without using a mathematical equation. Further, some of the features of the present invention can be used without the corresponding use of other features. That is, the accumulation of rounding errors and the periodic use of adjustments in the queueing process may be employed to advantage in any system in which rounding occurs and need not be the result of the specific rounding discussed herein. Accordingly, the foregoing description of the preferred embodiment should be considered as merely illustrative of the principles of the present invention and not in limitation thereof

Having thus described the invention, what is claimed is:

1. A system for calculating a revised queue position for a data flow where the system uses rounding, the system comprising:

a time-dependent calendar which has a plurality of queue positions with each queue position being adaptable to service a different queue and moves a data flow to another queue position after servicing it;

a calculator which generates a new position in the calendar based on stored values associated with the data flow;

a rounding mechanism which adjust the new position based on rounding the calculated new position;

an accumulator which accumulates the rounding errors from the rounding mechanism for each data flow; and an adjustor which periodically uses the accumulated rounding errors for each data flow to adjust the position in the calendar based on the accumulated rounding errors.

2. A method of correcting for accumulated errors in position in a calendar resulting from rounding of position information comprising:

determining a position in the calendar based upon a distance value concatenated to a residue value and generating a rounding error from that determination;

accumulating the rounding error for each member of the calendar;

adjusting for the accumulated rounding errors by changing the position in the calendar to compensate for the rounding errors when the rounding errors reach a threshold; and reducing the accumulated rounding errors by an amount based on the adjustment in the position in the calendar.

3. A system for calculating a revised queue position for a data flow where the system uses rounding, the system comprising:

a time-dependent calendar which has a plurality of queue positions and moves a data flow to another queue position after servicing it;

a calculator which generates a now position in the calendar based on stored values associated with the data flow and a distance value concatenated to a residue value;

a rounding mechanism which adjust the new position based on rounding the calculated new position;

an accumulator which accumulates the rounding errors from the rounding mechanism for each data flow; and an adjustor which periodically uses the accumulated rounding errors for each data flow to adjust the position in the calendar based on the accumulated rounding errors.

4. The system of claim 3 wherein the distance is being calculated from the algorithm (SSD*FL+RR.V)/N wherein SSD represents guarantee rate, * represents multiply operator, and FL represents frame length, RR.V represents residue and N represents number of slots in a calendar.

5. The system of claim 4 wherein the residue is being computed from the algorithm (SSD*FL+RR.V) % N wherein SSD represents guarantee rate, * represents multiply operator, FL represents frame length, RR.V represents residue, N represents number of slots in a calendar and % represents modulo operator.

6. The system of claim 5 wherein N=512.

7. A method to transmit frames to meet predefined QoS (Quality of Service) requirements comprising:

(a) providing a time-dependent calendar having a plurality of locations;

(b) attaching an identification number (I.D.) for at least one queue to a first location on said calendar;

(c) selecting a calendar location whereat the queue I.D. is attached;

(d) transmitting a frame from the queue;

(e) examining information relating to frame occupancy in said queue;

(f) if the queue contains additional frames to be transmitted, detach the queue i.d. from its first location at (b) and reattaching at a second location.

8. A method to transmit frames to meet predefined QoS (Quality of Service) requirements comprising:

(a) providing a time-dependent calendar having a plurality of locations;

(b) attaching an identification number (I.D.) for at least one queue to a first location on said calendar;

(c) selecting a calendar location whereat the queue I.D. is affached;

(d) transmitting a frame from the queue;

(e) examining information relating to frame occupancy in said queue;

(f) if the gueue contains additional frames to be transmitted, detach the queue i.d. from its first location at (b) and reattaching at a second location wherein said re-attaching includes calculating slot distance value and associated residue value.

9. A method to transmit frames to meet predefined QoS (Quality of Service) requirements comprising:

(b) attaching an identification number (I.D.) for at least one queue to a first location on said calendar;

(c) selecting a calendar location whereat the queue I.D. is attached;

(d) transmitting a frame from the queue;

(e) examining information relating to frame occupancy in said queue;

(f) if the queue contains additional frames to be transmitted, detach the queue i.d. from its first location at (b) and reattaching at a second location; and summing slot distance value and information derived from the first location to determine the next location whereat the queue i.d. is being reattached.

* * * * *